(12) United States Patent
Hung et al.

(10) Patent No.: US 12,518,423 B2
(45) Date of Patent: Jan. 6, 2026

(54) METHOD OF TRAINING A NEURAL NETWORK FOR VISION-BASED TRACKING AND ASSOCIATED APPARATUS AND SYSTEM

(71) Applicant: The Boeing Company, Arlington, VA (US)

(72) Inventors: Fan Hin Hung, Los Angeles, CA (US); Deepak Khosla, Camarillo, CA (US); Neale Ratzlaff, Los Angeles, CA (US); Tameez Latib, Calabasas, GA (US); Haden Smith, Guyton, GA (US); Leon Nguyen, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 262 days.

(21) Appl. No.: 18/521,974

(22) Filed: Nov. 28, 2023

(65) Prior Publication Data
US 2025/0173897 A1    May 29, 2025

(51) Int. Cl.
*G06T 7/73*    (2017.01)
*G06T 7/50*    (2017.01)
(Continued)

(52) U.S. Cl.
CPC .................. *G06T 7/75* (2017.01); *G06T 7/50* (2017.01); *G06T 7/55* (2017.01); *G06T 2200/04* (2013.01);
(Continued)

(58) Field of Classification Search
None
See application file for complete search history.

(56) References Cited

U.S. PATENT DOCUMENTS 7,980,512 B1    7/2011  Speer
8,854,433 B1   10/2014  Rafii
(Continued)

FOREIGN PATENT DOCUMENTS

CN      110097574        8/2019
EP      3566949 A1      11/2019
(Continued)

OTHER PUBLICATIONS

Zhao, et al., "Estimating 6D Pose From Localizing Designated Surface Keypoints", https://arxiv.org/pdf/1812.01387.pdf, accessed Dec. 5, 2023, pp. 1-9.
(Continued)

*Primary Examiner* — Haris Sabah
(74) *Attorney, Agent, or Firm* — Kunzler Bean & Adamson (57) ABSTRACT

Methods, apparatuses and systems of training a neural network using in a vision-based tracking system are disclosed. A two-dimensional (2D) image of at least a portion of an object is received via a camera that is fixed, relative to the object. Subsequently, a keypoint detector predicts a set of keypoints on the object in the 2D image, generating predicted 2D keypoints. These predicted 2D keypoints are then projected into three-dimensional (3D) space, and keypoint depth information is added to generate predicted 3D keypoints. To enhance the training process, a 3D model of the object is utilized. Known rotational and translational information of the object in the 2D image is incorporated to known 3D model keypoints, resulting in transformed 3D model keypoints. Following this, a comparison between predicted 3D keypoints and transformed 3D model keypoints is made to calculate a loss value. The training process is further refined using an optimizer, minimizing the loss value during a training period.

20 Claims, 5 Drawing Sheets

(51) Int. Cl.
   *G06T 7/55* (2017.01)
   *G06V 10/42* (2022.01)
(52) U.S. Cl.
   CPC ............... *G06T 2207/20081* (2013.01); *G06T 2207/20084* (2013.01); *G06T 2207/30252* (2013.01); *G06V 10/42* (2022.01)

(56) References Cited

U.S. PATENT DOCUMENTS

| | | | |
|---|---|---|---|
| 8,994,723 | B2 | 3/2015 | Drost et al. |
| 9,150,310 | B1 | 10/2015 | Bray et al. |
| 10,565,731 | B1 | 2/2020 | Reddy |
| 10,909,715 | B1 | 2/2021 | Boggs |
| 10,929,654 | B2* | 2/2021 | Iqbal ............ G06V 40/28 |
| 10,937,189 | B2 | 3/2021 | Li et al. |
| 11,254,440 | B2 | 2/2022 | Ropers |
| 11,459,116 | B2 | 10/2022 | Kyono et al. |
| 11,748,913 | B2 | 9/2023 | Ali et al. |
| 11,827,203 | B2 | 11/2023 | Chakravarty et al. |
| 11,880,503 | B1 | 1/2024 | Haentjens |
| 12,139,271 | B2 | 11/2024 | Khosla |
| 2007/0023575 | A1 | 2/2007 | von Thal |
| 2017/0073080 | A1 | 3/2017 | Hughes |
| 2018/0173839 | A1* | 6/2018 | Fang ............ G03F 7/70616 |
| 2018/0178924 | A1 | 6/2018 | Zomeno Rodriguez |
| 2019/0031347 | A1 | 1/2019 | Duan |
| 2019/0344902 | A1 | 11/2019 | Cra |
| 2019/0355150 | A1 | 11/2019 | Tremblay et al. |
| 2019/0382126 | A1 | 12/2019 | Rix et al. |
| 2020/0217666 | A1 | 7/2020 | Zhang |
| 2021/0117661 | A1* | 4/2021 | Iqbal ............ G06N 3/0464 |
| 2021/0304438 | A1 | 9/2021 | Ye |
| 2022/0108468 | A1 | 4/2022 | Nakamura |
| 2022/0212811 | A1 | 7/2022 | Khosla et al. |
| 2022/0215571 | A1 | 7/2022 | Leach |
| 2022/0258875 | A1 | 8/2022 | Kyono et al. |
| 2022/0276652 | A1 | 9/2022 | Kyono et al. |
| 2022/0277472 | A1 | 9/2022 | Birchfield et al. |
| 2022/0292772 | A1* | 9/2022 | Wang ............ G06V 10/56 |
| 2022/0306311 | A1 | 9/2022 | Kyono |
| 2023/0244835 | A1 | 8/2023 | Guo |
| 2023/0281864 | A1 | 9/2023 | Guo |
| 2023/0281945 | A1* | 9/2023 | Cashman ............ G06V 10/774 |
| 2024/0375786 | A1 | 11/2024 | Hung et al. |
| 2024/0378744 | A1 | 11/2024 | Smith et al. |
| 2024/0391494 | A1 | 11/2024 | Rosenblum et al. |
| 2025/0011002 | A1 | 1/2025 | Latib et al. |
| 2025/0022157 | A1 | 1/2025 | Latib et al. |
| 2025/0178741 | A1 | 6/2025 | Hung et al. |
| 2025/0182398 | A1 | 6/2025 | Hung et al. |

FOREIGN PATENT DOCUMENTS

| | | |
|---|---|---|
| EP | 4024340 | 7/2022 |
| EP | 4024346 | 7/2022 |
| WO | 2025003634 | 1/2025 |

OTHER PUBLICATIONS

Xiao et al., "Simple Baselines for Human Pose Estimation and Tracking", https://arxiv.org/pdf/1804.06208.pdf, accessed Dec. 5, 2023, pp. 1-9.
Suwajanakorn, et al., "Discovery of Latent 3D Keypoints via End-to-end Geometric Reasoning", https://keypointnet.github.io/keypointnet_neurips.pdf, accessed Dec. 5, 2023, pp. 1-12.
Lee, et al., "Camera-to-Robot Pose Estimation from a Single Image", 2020 IEEE International Conference on Robotics and Automation (ICRA), 2020, pp. 9426-9432, Paris, France.
Bashir, et al., "Small Object Detection in Remote Sensing Images with Residual Feature Aggregation-Based Super-Resolution and Object Detector Network", Remote Sens., 2021, 13, 1854, pp. 1-21.
Unel, et al., "The Power of Tiling for Small Object Detection", Computer Vision Foundation, pp. 1-10.
Lee, et al., "Online Extrinsic Camera Calibration for Temporally Consistent IPM Using Lane Boundary Observations with a Lane Width Prior", https://arxiv.org/pdf/2008.03722.pdf, accessed Dec. 5, 2023, pp. 1-6.
Zhang, et al., "A Flexible Online Camera Calibration Using Line Segments", Journal of Sensors, 2016, vol. 2016, Article ID 2802343, pp. 1-17, Hindawi Publishing Corporation.
Liu et al., Simple and Principled Uncertainty Estimation with Deterministic Deep Learning via Distance Awareness, 34th Conference on Neural Information Processing Systems, 2020, pp. 1-15, Vancouver, CA.
Guo et al., On Calibration of Modern Neural Networks, Proceedings of the 34th International Conference on Machine Learning, Aug. 3, 2017, pp. 1-14, Sydney, Australia.
Pavlakos, et al., 6-DoF Object Pose from Semantic Keypoints, 2017 IEEE Internation Conference on Robotics and Automation, pp. 1-8.
Extended European Search Report for EP Patent Application No. 24192391.1 dated Jan. 24, 2025, pp. 1-13.
Extended European Search Report for EP Patent Application No. 24192395.2 dated Jan. 24, 2025, pp. 1-12.
Li et al., Deep Supervision with Intermediate Concepts, IEEE Transactions on Pattern Analysis and Machine Intelligence, Aug. 2019, pp. 1828-1843, vol. 41, No. 8.
Reddy et al,. Occlusion-Net: 2D/3D Occluded Keypoint Localization Using Graph Networks, 2019, IEEE/CVF Conference on Computer Vision and Pattern Recognition, pp. 7318-7327, IEEE Computer Society.
Park et al., Robust multi-task learning and online refinement for spacecraft pose estimation across domain gap, 2023, pp. 1-15, Advances in Space Research.
Gong et al., Research of an Unmanned Aerial Vehicle Autonomous Aerial Refueling Docking Method Based on Binocular Vision, 2023, pp. 1-21, 7, 433.
Morreale et al., Neural Semantic Surface Maps, Sep. 9, 2023, pp. 1-15.
Reed, Benjamin B., The Restore-L Servicing Mission, Mar. 29, 2016, pp. 1-32, retrieved from URL:https://www.nasa.gov/wp-content/uploads/2015/03/reed_restorel_tagged.pdf Jan. 14, 2025.
Extended European Search Report for EP Patent Application No. 24165111.6 dated Jul. 10, 2024.
Lynch, J. C., Monocular Pose Estimation for Automated Aerial Refueling via Perspective-n-PointPerspective-n-Point, AFIT Scholar, Mar. 2022, pp. 1-76, accessed from https://scholar.afit.edu/cgi/viewcontent.cgi?article=7913&context=etd Jul. 17, 2024.
Extended European Search Report for EP Patent Application No. 24200751.6 dated Mar. 7, 2025.
Dementhon, et al., Model-Based Object Pose in 25 Lines of Code, pp. 1-9.
Extended European Search Report for EP Patent Application No. 24196940.1 dated Mar. 7, 2025.
Wang et al., Revisiting Monocular Satellite Pose Estimation With Transformer, IEEE Transactions on Aerospace and Electronic Systems, Oct. 2022, pp. 4279-4294, vol. 58, No. 5.
Chen et al., Satellite Pose Estimation with Deep Landmark Regression and Nonlinear Pose Refinement, Computer Vision Foundation, 2019, pp. 1-9.
Quang et al., Monocular Vision and Machine Learning for Pose Estimation, 2023, pp. 128-136.
Extended European Search Report for EP Patent Application No. 24196935.1 dated Feb. 6, 2025.
Shi et al., Fast Uncertainty Quantification for Deep Object Pose Estimation, IEEE International Conference on Robotics and Automation, May 2021, pp. 5200-5207.
Vaghi et al., A Comparison of Uncertainty Estimation Approaches for DNN-based Camera Localization, Nov. 2022, pp. 1-7.
Extended European Search Report for EP Patent Application No. 24171550.7 dated Oct. 16, 2024, pp. 1-13.
Gupta, et al., "CullNet: Calibrated and Pose Aware Confidence Scores for Object Pose Estimation", 2019 IEEE/CVF International Conference on Computer Vision Workshop (ICCVW), IEEE, Oct. 27, 2019, pp. 2758-2766.
Klein, et al., "Uncertainty in Data-Driven Kalman Filtering for Partially Known State-Space Models", ICASSP 2022—2022 IEEE

(56) References Cited

OTHER PUBLICATIONS

International Conference on Acoustics, Speech, and Signal Processing (ICASSP), IEEE, May 23, 2022, pp. 3194-3198.

Shi, et al., "Fast Uncertainty Quantification for Deep Object Pose Estimation", Arvix.org, Cornell University Library, Nov. 16, 2020, pp. 1-8.

Teng Chin-Hung, "Enhanced Outlier Removal for Extended Kalman Filter based Visual Inertial Odometry", 2018 IEEE International Conference on Applied System Innovation (ICASI), IEEE, Apr. 13, 2018, pp. 74-77.

Extended European Search Report for EP Patent Application No. 24182647.8 dated Oct. 24, 2024, pp. 1-7.

Extended European Search Report for EP Patent Application No. 24183945.5 dated Nov. 20, 2024, pp. 1-8.

Lee, et al., "Long-Range Pose Estimation for Aerial Refueling Approaches Using Deep Neural Networks", Journal of Aerospace Information Systems, vol. 17, No. 11, Nov. 1, 2020, pp. 634-646.

Thomas, et al., "Advances in air to air refuelling", Progress in Aerospace Sciences, vol. 71, Jul. 28, 2014, pp. 14-35.

Parsons et al., Analysis of Simulated Imagery for Real-Time Vision-Based Automate Aerial Refueling, Journal of Aerospace Information Systems, Mar. 2019, pp. 77-93, vol. 16, No. 3.

Newell et al., Stacked Hourglass Networks for Human Pose Estimation, Jul. 2016, pp. 1-17, article obtain from https://arxiv.org/pdf/1603.06937 Sep. 16, 2025.

Extended European Search Report for EP Patent Application No. 21205493.6 dated Mar. 31, 2022.

Doebbler, et al., "Boom and Receptacle Autonomous Air Refueling Using Visual Snake Optical Sensor", Journal of Guidance and Control and Dynamics, Nov. 1, 2007, pp. 1753-1769, vol. 30, No. 6.

Anderson, et al., "Augmenting Flight Imagery from Aerial Refueling", Oct. 21, 2019, Computer Vision—ECCV 2020 : 16th European Conference, Glasgow, UK, Aug. 23-28, 2020, pp. 154-165, Proceedings; [Lecture Notes in Computer Science ; ISSN 0302-9743], Springer International Publishing, Cham.

Soujanya, et al. "Addressing corner detection issues for machine vision based UAV aerial refueling" Machine Vision and Applications, Springer, Jan. 10, 2007, pp. 261-276, vol. 18, No. 5, Berlin, DE.

Duan, et al., "Visual Measurement in Simulation Environment for Vision-Based UAV Autonomous Aerial Refueling", IEEE Transactions on Instrumentation and Measurement, IEEE, USA, Sep. 1, 2015, pp. 2468-2480, vol. 64, No. 9, USA.

Cui, et al., "Visual Servoing of a Flexible Aerial Refueling Boom With an Eye-in-Hand Camera", IEEE Transactions on Systems, Man, and Cybernetics: Systems, IEEE, Jan. 8, 2020, pp. 6282-6292, vol. 51, No. 10, Piscataway, NJ, USA.

Lakshminarayanan, et al. "Simple and Scalable Predictive Uncertainty Estimation using Deep Ensembles", 31st Conference on Neural Information Processing Systems (NIPS 2017), 2017, pp. 1-15, Long Beach, CA, USA.

Shen, et al., "Real-Time Uncertainty Estimation in Computer Vision via Uncertainty-Aware Distribution Distillation", Computer Vision Foundation, 2021, pp. 707-716.

Peng, et al., "PVNet: Pixel-wise Voting Network for 6DoF Pose Estimation", Computer Vision Foundation, pp. 4561-4570.

Brachmann, et al., "Uncertainty-Driven 6D Pose Estimation of Objects and Scenes from a Single RGB Image", Computer Vision Foundation, pp. 3364-3372.

Rasmussen, C.E., "Gaussian Processes in Machine Learning", Max Planck Institute for Biological Cybernetics, pp. 63-71, Tubingen, Germany.

Romano, et al., "Conformalized Quantile Regression", 33rd Conference on Neural Information Processing Systems, 2019, pp. 1-11, Vancouver, Canada.

Ratzlaff, et al. "Generative Particle Variational Inference via Estimation of Functional Gradients", Proceedings of the 38 th International Conference on Machine, 2021, pp. 1-22.

Tobin et al., "Domain Randomization for Transferring Deep Neural Networks from Simulation to the Real World", https://arxiv.org/pdf/1703.06907.pdf, accessed Dec. 5, 2023, pp. 1-8.

Mehta, et al. "Active Domain Randomization", https://arxiv.org/pdf/1904.04762.pdf, accessed Dec. 5, 2023, pp. 1-15.

Akkaya et al., "Solving Rubik's Cube With a Robot Hand", https://arxiv.org/pdf/1910.07113.pdf, accessed Dec. 5, 2023, pp. 1-51.

Fu, et al. "The 6D pose estimation of the aircraft using geometric property." IEEE Transactions on Circuits and Systems for Video Technology, Jul. 2023, pp. 3358-3368, vol. 33, No. 7.

Hashemi, M., "Enlarging smaller images before inputting into convolutional neural network: zero-padding vs. interpolation." Journal of Big Data, 2019, pp. 1-13.

* cited by examiner

METHOD OF TRAINING A NEURAL NETWORK FOR VISION-BASED TRACKING AND ASSOCIATED APPARATUS AND SYSTEM

FIELD

This disclosure relates generally to training neural networks, and more particularly to training neural networks for vision-based tracking.

BACKGROUND

Neural networks have gained significant important in various applications, including vision-based tracking. Prior to use in a vision-based tracking system, a neural network must be trained to perform a task, such a keypoint detection. Typically, neutral networks for vision-based tracking systems fall into two categories: two-dimensional (2D) keypoint detectors, trained to predict 2D keypoints in an image and three-dimensional (3D) keypoint detectors, trained to predict 3D keypoints in 3D space. While 2D keypoint detectors, often trained with a single image, exhibit high accuracy in predicting 2D keypoints, they struggle in scenarios with occlusions or environmental variables. On the other hand, 3D keypoint detectors, trained differently from 2D keypoint detectors, exhibit inaccuracies in 2D keypoint detection and require multiple object views during training due to the limited depth information available in a single image, requiring more extensive dataset for effective training.

SUMMARY

The subject matter of the present application has been developed in response to the present state of the art, and in particular, in response to the problems of and needs created by, or not yet fully solved by, typical training of neural networks. Generally, the subject matter of the present application has been developed to provide a method of training neural networks used for prediction that overcomes at least some of the above-discussed shortcomings of prior art techniques.

Disclosed herein in a computer implemented method of training a neural network used in a vision-based tracking system. The method includes receiving a two-dimensional (2D) image of at least a portion of an object via a camera that is fixed, relative to the object. The method also includes predicting a set of keypoints on the object in the 2D image by a keypoint detector to generate predicted 2D keypoints. The method further includes projecting the predicted 2D keypoints into three-dimensional (3D) space and adding keypoint depth information to generate predicted 3D keypoints. The method additionally includes using a 3D model of the object and adding known rotational and translational information of the object in the 2D image to generate transformed 3D model keypoints. The method also includes comparing the predicted 3D keypoints to the transformed 3D model keypoints to calculate a loss value. The method further includes using an optimizer to train the keypoint detector to minimize the loss value during a training period. The preceding subject matter of this paragraph characterizes example 1 of the present disclosure.

The camera is configured to be fixed on a second object. The preceding subject matter of this paragraph characterizes example 2 of the present disclosure, wherein example 2 also includes the subject matter according to example 1, above.

The camera includes camera intrinsics. The step of projecting the predicted 2D keypoints into 3D space relies on knowing at least one of the camera intrinsics. The preceding subject matter of this paragraph characterizes example 3 of the present disclosure, wherein example 3 also includes the subject matter according to any of examples 1-2, above.

The keypoint depth information is at least partially determined based on the camera intrinsics known by the keypoint detector. The preceding subject matter of this paragraph characterizes example 4 of the present disclosure, wherein example 4 also includes the subject matter according to example 3, above.

The 3D model of the object is in a fixed position without any rotation or translation. The preceding subject matter of this paragraph characterizes example 5 of the present disclosure, wherein example 5 also includes the subject matter according to any of examples 1-4, above.

The known rotational and translational information of the object is obtained from real data measured by at least one physical sensor coupled to the object. The preceding subject matter of this paragraph characterizes example 6 of the present disclosure, wherein example 6 also includes the subject matter according to any of examples 1-5, above.

The known rotational and translational information of the object is obtained from simulated data. The known rotational and translational information is pre-defined in the simulated data. The preceding subject matter of this paragraph characterizes example 7 of the present disclosure, wherein example 7 also includes the subject matter according to any of examples 1-6, above.

The object is a receiver aircraft. The preceding subject matter of this paragraph characterizes example 8 of the present disclosure, wherein example 8 also includes the subject matter according to any of examples 1-7, above.

After training the keypoint detector, the keypoint detector is configured to be used to compute a predicted 3D pose based on the predicted 2D keypoints. The preceding subject matter of this paragraph characterizes example 9 of the present disclosure, wherein example 9 also includes the subject matter according to any of examples 1-8, above.

The predicted 3D pose is used to guide a refueling operating between a receiver aircraft and a tanker aircraft. The preceding subject matter of this paragraph characterizes example 10 of the present disclosure, wherein example 10 also includes the subject matter according to example 9, above.

The loss value comprises a translational loss value and a rotational loss value. The preceding subject matter of this paragraph characterizes example 11 of the present disclosure, wherein example 11 also includes the subject matter according to any of examples 1-10, above.

The loss value includes a composite of at least one of a first loss values and at least one of a second loss values. The first loss values include a translational loss value, a rotational loss value, and a 3D keypoint loss value. The second loss values include a translational loss value, a rotational loss value, a 3D keypoint loss value, and a 2D keypoint loss value. The preceding subject matter of this paragraph characterizes example 12 of the present disclosure, wherein example 12 also includes the subject matter according to any of examples 1-11, above.

The translational loss value is calculated by computing an absolute difference between a predicted translation vector of the object and a ground truth translation vector of the object. The rotational loss value is calculated by computing a matrix product of a ground truth rotational matrix and a transpose of a predicted rotational matrix, then subtracting an identity matrix to obtain an outcome, and taking the absolute value of the outcome. The preceding subject matter of this paragraph characterizes example 13 of the present disclosure, wherein example 13 also includes the subject matter according to example 11, above.

Also disclosed herein is a vision-based tracking training apparatus. The apparatus includes at least one processor and a memory device storing instructions. The memory device, when executed by the at least one processor, cause the at least one processor to, at least receive a two-dimensional (2D) image of at least a portion of an object via a camera that is fixed, relative to the object. The memory device, when executed by the at least one processor, also cause the at least one processor to predict a set of keypoints on the object in the 2D image by a keypoint detector to generate predicted 2D keypoints. The memory device, when executed by the at least one processor, further cause the at least one processor to project the predicted 2D keypoints into three-dimensional (3D) space and add keypoint depth information to generate predicted 3D keypoints. The memory device, when executed by the at least one processor, additionally cause the at least one processor to generate transformed 3D model keypoints using a 3D model of the object and known rotational and translational information of the object in the 2D image. The memory device, when executed by the at least one processor, also cause the at least one processor to compare the predicted 3D keypoints to the transformed 3D model keypoints to calculate a loss value. The memory device, when executed by the at least one processor, further cause the at least one processor to utilize an optimizer to train the keypoint detector to minimize the loss value during a training period. The preceding subject matter of this paragraph characterizes example 14 of the present disclosure.

The camera includes camera intrinsics. Projecting the predicted 2D keypoints into 3D spaces relies on knowing at least one of the camera intrinsics. The preceding subject matter of this paragraph characterizes example 15 of the present disclosure, wherein example 15 also includes the subject matter according to example 14, above.

The loss value includes a translational loss value and a rotational loss value. The preceding subject matter of this paragraph characterizes example 16 of the present disclosure, wherein example 16 also includes the subject matter according to any of examples 14-15, above.

The translational loss value is calculated by computing an absolute difference between a predicted translation vector of the object and a ground truth translation vector of the object. The rotational loss value is calculated by computing a matrix product of a ground truth rotational matrix and a transpose of a predicted rotational matrix, then subtracting an identity matrix to obtain an outcome, and taking the absolute value of the outcome. The preceding subject matter of this paragraph characterizes example 17 of the present disclosure, wherein example 17 also includes the subject matter according to example 16, above.

Further disclosed herein is a vision-based tracking training system. The vision-based tracking training system includes a camera fixed relative to an object. The vision-based tracking training system also includes at least one processor and a memory device storing instructions. The memory device, when executed by the at least one processor, cause the at least one processor to, at least receive a two-dimensional (2D) image of at least a portion of the object via the camera. The memory device, when executed by the at least one processor, also causes the at least one processor to predict a set of keypoints on the object in the 2D image by a keypoint detector to generate predicted 2D keypoints. The memory device, when executed by the at least one processor, further causes the at least one processor to project the predicted 2D keypoints into three-dimensional (3D) space and add keypoint depth information to generate predicted 3D keypoints. The memory device, when executed by the at least one processor, additionally causes the at least one processor to generate transformed 3D model keypoints using a 3D model of the object and known rotational and translational information of the object in the 2D image. The memory device, when executed by the at least one processor, also causes the at least one processor to compare the predicted 3D keypoints to the transformed 3D model keypoints to calculate a loss value. The memory device, when executed by the at least one processor, further causes the at least one processor to utilize an optimizer to train the keypoint detector to minimize the loss value during a training period. The preceding subject matter of this paragraph characterizes example 18 of the present disclosure.

The camera includes camera intrinsics. Projecting the predicted 2D keypoints into 3D space relies on knowing at least one of the camera intrinsics. The preceding subject matter of this paragraph characterizes example 19 of the present disclosure, wherein example 19 also includes the subject matter according to example 18, above.

The loss value includes a translational loss value and a rotational loss value. The preceding subject matter of this paragraph characterizes example 20 of the present disclosure, wherein example 20 also includes the subject matter according to any of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples. Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Disclosed herein are examples of methods, systems, and apparatuses of training neural networks used in vision-based tracking systems. The following provides some features of at least some examples of the training methods, systems, and apparatus. While neural networks have gained importance in predictive applications, their ability to adapt and perform optimally in all input data scenarios is constrained by the data inputs provided during their training process. A keypoint detector, a specific type of neural network configured to predict the location of keypoints on an object, is trained during a training period. Specifically, the methods, systems, and apparatuses leverage the strengths of both conventionally trained 2D and 3D keypoint detectors, offering a training procedure that achieves high accuracy in 2D keypoint detection and effectively handles occlusions and other challenges by explicitly learning geometric features. Accordingly, the keypoint detector, disclosed herein, is trained using a 3D model to improve its proficiency in handling diverse input data scenarios, including occlusions and other complex variables.

The keypoint detector is trained using a training image(s) of an object from a single viewpoint. The keypoint detector is trained to predict 2D keypoints on the object within the training image(s). A loss value is calculated by comparing the predicted 2D keypoints to ground truth keypoints (i.e., actual known keypoints), and an optimizer is used to minimize the loss value. Moreover, to improve the performance of the keypoint detector on diverse input data scenarios, the loss value includes geometric information. In other words, the loss incorporates 3D geometric information alongside the 2D keypoint information. Accordingly, during training, additional loss terms for rotation and translation are integrated into the keypoint detector by incorporating a 3D model of the object present in the training image(s).

Figure 1:
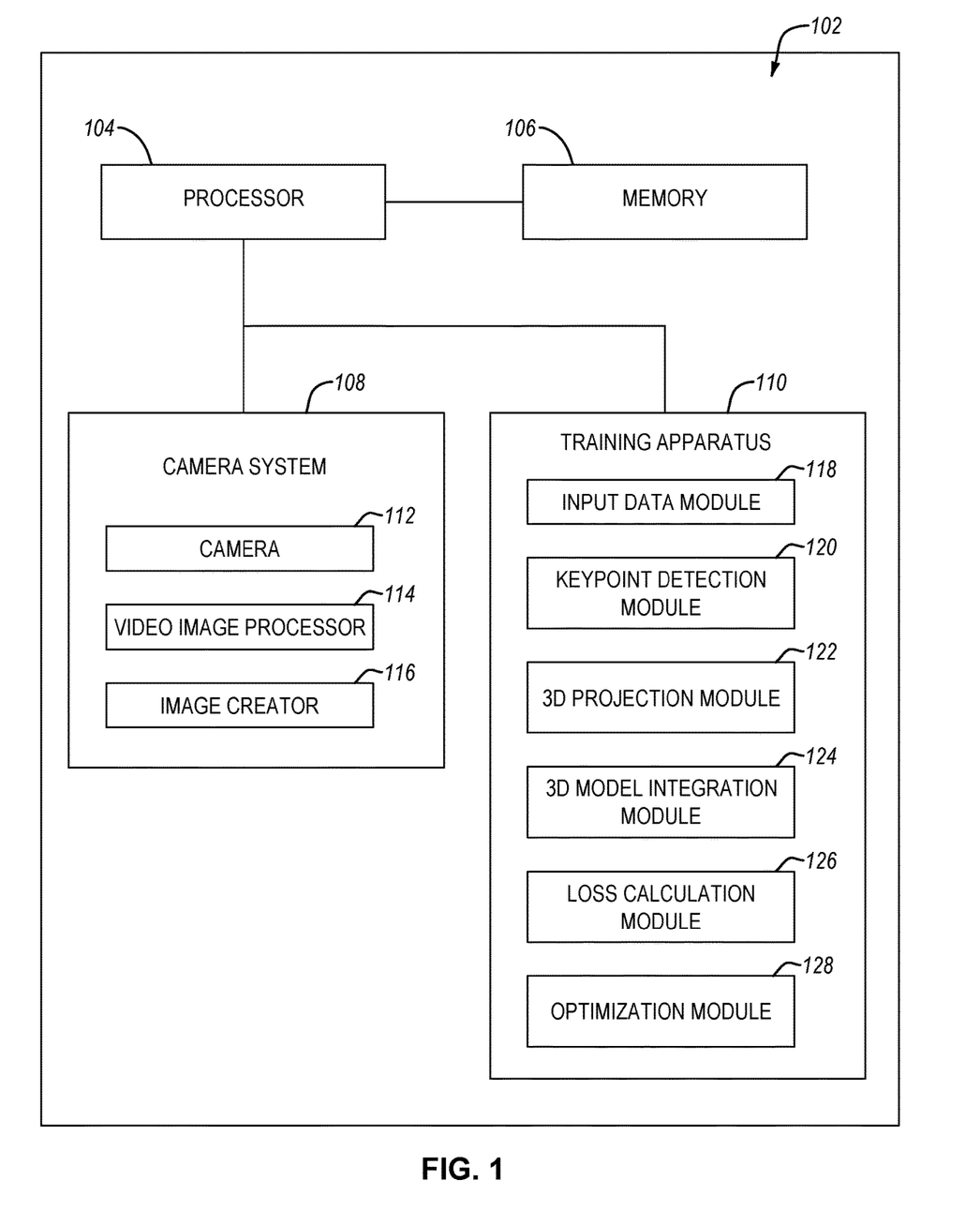
FIG. 1 is a schematic block diagram illustrating a neural network training system, according to one or more examples of the present disclosure.

Referring to FIG. 1 is a neural network training system 102. As used herein, a neural network training system is a system designed to facilitate the training and optimization of a neural network that is configured to be used within a vision-based tracking system. The vision-based tracking system is a system that employs visual information, typically captured through cameras or other imaging devices, to monitor and track objects or subjects within a given environment. The vision-based tracking system assesses the movement, position, and orientation of these objects in real-time. For example, vision-based tracking systems may be used within aviation, autonomous vehicles, medical imaging, industrial automation, etc. Vision-based tracking systems enable applications such as aerial refueling processes, object tracking, robot navigation, and more, where understanding the precise location and orientation of objects in a scene is crucial for real-world interactions and decision-making. The vision-based tracking system is configured to be located on a host object and assess a tracked object. Accordingly, before a neural network can be used within a vision-based tracking system it must undergo training, such as the neural network training system 102.

The neural network training system 102 includes a processor 104, memory 106, a camera system 108, and a neural network training apparatus 110. In some examples, non-transitory computer readable instructions (i.e., code) stored in the memory 106 (i.e., storage media) cause the processor 104 to execute operations, such as the operations in the neural network training apparatus 110.

In various examples, the camera system 108 includes a camera 112, a video image processor 114, and an image creator 116. The camera 112 is any device capable of capturing images or video and includes a lens or lenses which, in some examples, may have remotely operated focus and zoom capabilities. The video image processor 114 is configured to process the images or video captured by the camera 112, and may adjust focus, zoom, and/or perform other operations to improve the image quality. The image creator 116 assembles the processed information from the video image processor 114 into a final image or representation which can be used for various purposes. The camera 112 is mounted to the host object, such that the camera 112 is fixed, relative to the tracked object. The camera 112 is fixed at a location where a field of view of the camera 112 includes at least a portion of the tracked object.

In various examples, the neural network training apparatus 110, through the processor 104, is configured to train a neural network using input data from the camera system 108. Input data may include a 2D image or a plurality of 2D images, and, in some examples, input data may include video feed from which 2D images can be generated. The camera system 108 may be providing the input data in real-time or the camera system 108 may have previous provided input data that is stored in memory 106 for later use by the processor 104. The neural network training apparatus 110, in some examples, includes an image capture module 118, a keypoint detection module 120, a 3D projection module 122, a 3D model integration module 124, a loss calculation module 126, and an optimization module 128.

The image capture module 118 is configured to receive a 2D image of at least a portion of an object (i.e., tracked object). In some examples, the image capture module 118 may transform input data into a 2D image. The image capture module 118 is configured to receive at least one 2D image. In other examples, the image capture module 118 may receive a plurality of 2D images, captured at different times, all from the same viewpoint. In yet other examples, a single 2D image may be augmented to produce a plurality of 2D images. The 2D image is received from the camera system 108, either directly or indirectly through previously stored input data in memory 106. Alternatively, the 2D image is a synthetic or simulated 2D image, that is artificially generated or augmented, to represent a 2D image that would be obtained from the camera system 108. A synthetic or simulated 2D image may be used in cases where generating real-world data is difficult or expensive to obtain.

The keypoint detection module 120 is configured to predict a set of keypoints on the tracked object in the 2D image by the keypoint detector (i.e., neural network) to generate predicted 2D keypoints. That is, using the keypoint detector, a set of keypoints, or locations of salient features on the tracked object, are predicted within the 2D image, to generate the predicted 2D keypoints. Each keypoint of the predicted 2D keypoints refers to a salient feature, such as a distinctive and relevant visual element or point of interest in the 2D image. For example, keypoints may refer to specific corners, edges, protrusions, or other unique features that help in identifying and tracking objects within an image. Accordingly, the keypoint detection module 120 analyzes the visual data in the 2D image and predicts the location of the set of keypoints based on its analysis. In some examples, the location of one or more keypoints may be hidden or otherwise obscured in the 2D image, such as by occlusions, including self-occlusions, or environmental variables that affect the image quality of the 2D image. For example, in the case of an occlusion (i.e., an obstruction), the occlusion may block at least one keypoint from the field of view of the camera 112, such that the location of the at least one keypoint is not visible in the 2D image. Additionally, environmental variables, such as lighting and weather, can result in a 2D image with hard to predict keypoint locations. A keypoint detector that is only trained on 2D input data may not accurately determine occluded or obscured keypoint locations within the 2D image. However, the accuracy of the keypoint detection module 120 in such cases may be improved using a 3D model of the tracked object. Using the 3D model, keypoint locations can influence the prediction of other keypoint locations and result in more accurate predictions for occluded or obscured keypoint predictions.

The 3D projection module 122 is configured to project the predicted 2D keypoints, from the keypoint detection module 120, into 3D space, transitioning the predicted 2D keypoints from the 2D image to a 3D spatial context. That is, the predicted 2D keypoints are converted from a flat 2D image to a 3D space. Moreover, the 3D projection module 122 adds keypoint depth information to the predicted 2D keypoints to generate predicted 3D keypoints. In other words, the 3D projection module 122 incorporates information about how far each keypoint is from the viewpoint (i.e., camera). This additional depth information enables the predicted 2D keypoints to be constructed into predicted 3D keypoints with rotation and translation information. In some examples, the depth information of the predicted 2D keypoints can be determined using at least one known camera intrinsic. Camera intrinsics refers to the parameters of the camera 112 that define its geometry and imaging characteristics. Common camera intrinsic includes include, but are not limited to, focal length, principal point, lens distortion parameters, image sensor format, camera dimensions, pixel aspect ratio, skew etc. Using at least one known camera intrinsic, depth information can be derived and added to the predicted 2D keypoints to generate predicted 3D keypoints. The 3D projection module 122 is equipped with knowledge of at least one of the camera intrinsics. In other words, within a training pipeline, of which the 3D projection module 122 is a component, there is awareness of at least one camera intrinsic. In other examples, the keypoint depth information may be determined by at least one known camera intrinsic and other depth information, such as depth information provided by physical sensors.

The 3D model integration module 124 is configured to provide a 3D model of the tracked object in the 2D image. The 3D model provides the geometric parameters of a model based on the tracked object into the training process of the keypoint detector. Accordingly, using the 3D model enables the keypoint detector to understand the volumetric representation of the tracked object. This understanding allows the keypoint detector to infer the location of keypoints based on the 3D model, providing insight into where specific keypoints should be positioned.

The known 3D model keypoints are initially established on the 3D model in model space, lacking translation and rotation information. However, recognizing that the tracked object in the 2D image has some rotation and translation, in order to compare the 3D model and the 2D image, the 3D model and/or known 3D model keypoints need to be adjusted to include the rotation and translation of the tracked object in the 2D image. Therefore, known rotational and translational information of the tracked object is added to the 3D model to generate transformed 3D model keypoints. That is, the transformed 3D model keypoints are transformed from the initial known 3D model keypoints into a representation that aligns with the variations introduced by rotation and translation of the tracked object when the 2D image was captured. In some examples, the known rotational and translational information of the tracked object is obtained from real data measured by at least one physical sensor coupled to the tracked object. In other examples, the known rotational and translational information is obtained from simulated data, such as when the 2D image is a synthetic or simulated 2D image. For example, the known rotational and translational information may be pre-defined in the simulated data.

The loss calculation module 126 is configured to compare the predicted 3D keypoints to the transformed 3D model keypoints to calculate a loss value. Generally, a loss value for a 2D keypoint detector is calculated by comparing the 2D predictions of the 2D keypoint detectors to ground truth (i.e., known) 2D keypoints, this is referred to as a 2D keypoint loss value. The loss calculation module 126 of the neural network training apparatus 110 modifies this approach by adding geometric information, in addition to the 2D information, into the loss value. That is, during training, loss terms based on geometric information are added into the loss calculation to calculate the loss value of the keypoint detector. Accordingly, the loss value may include any of the following: 1) a translational loss value and a rotational loss value, 2) the translational loss value, the rotational loss value, and at least one other loss term, 3) a 3D keypoint loss value and at least one other loss term, 4) the translational loss value and at least one other loss term, or 5) the rotational loss value and at least one other loss term. Other loss terms may include but are not limited to, the translational loss value, the rotational loss value, the 3D keypoint loss value, the 2D keypoint loss value and other standard loss terms, The 3D keypoint loss value is found by minimizing L in the equation $L=\|WZ-(RM+T)\|$, where L is the loss value, W is the projection of predicted 2D keypoints into 3D camera space, Z is the predicted 2D keypoint depth information, R is the rotation of the tracked object, M is the known 3D model keypoints of the 3D model, and T is the translation of the tracked object. More specifically, the term W represents the 3D keypoints in direction only, as it does not include depth information. Depth information is added to the 3D keypoints by term Z and requires that at least one camera intrinsic is known to determine Z. The term W is represented as a 3×k matrix, where k is the number of keypoints to predict by the keypoint detector in the 2D image. The term Z is represented as a k×k diagonal matrix. The term R is represented as a 3×3 rotation matrix representing the roll, pitch, and yaw information of the tracked object projected in 3D space. The term T is represented as a 3×1 translation vector representing the x, y, and z position of the tracked object projected in 3D space. In some cases, the term T can also be represented as a 3×N matrix whose columns are all equal. The term M represents the known 3D model keypoints in model space, when no roll, pitch, yaw, or translation (x, y, z) is applied to the 3D model and is represented as a 3×k matrix. Additionally, $\|WZ-(RM+T)\|$ represents a vector or matrix norm of $WZ-(RM+T)$. The norm representation could be any norm function such as L2 norm or frobenius norm.

For a single 2D image used for training the keypoint detector, the terms Z, R, M, and T are all ground truth information, that is, known values against which other predictions can be evaluated. Specifically, the term M is ground truth information of the 3D model of the tracked object, while the terms R and T are ground truth information based on the tracking object projected in 3D space. The term Z can be computed, before training of the keypoint detector, using ground truth 2D keypoints (i.e., known 2D keypoints). Consequently, with a given training 2D image, the keypoint detector is employed during training to calculate the term W by projecting predicted 2D keypoints into 3D camera space. After determining the term W, and using the known values of the terms Z, R, M and T, the loss value for the keypoint detector trained using a single 2D image and a 3D model can be computed, incorporating both the translation and rotation into the overall calculation.

Utilizing the keypoint detector's predicted 3D keypoints, the translational loss value of a keypoint detector prediction can also be calculated, representing the difference between the predicted translation of 3D keypoints of the tracked object and the transformed 3D model keypoints. Specifically, the translational loss value of the keypoint detectors prediction is calculated by computing an absolute difference between a predicted translation vector of the tracking object and a ground truth translation vector of the tracked object. That is, $L_t=\|T-T_{gt}\|$, where $L_t$ is the translational loss value, T is the translation of the predicted 3D keypoints (i.e., predicted translation vector), and $T_{gt}$ is the translation of the ground truth of the tracked object. This calculation quantifies how different the predicted 3D keypoints are from the transformed 3D model keypoints in terms of translation. The predicted translation vector T is derived from the predicted 3D keypoints (WZ), the ground truth rotation ($R_{gt}$) and the model keypoints (M). Accordingly, the predicted translation vector T is not explicitly predicted, instead, the 3D keypoints are predicted and, with other values, utilized to determine the predicted translation vector.

Similarly, utilizing the keypoint detector's predicted 3D keypoints, the rotational loss value of a keypoint detector prediction can additionally be calculated, representing the difference between the predicted rotation of 3D keypoints of the tracked object and the transformed 3D model keypoints. Specifically, the rotational loss value is calculated by computing a matrix product of a ground truth rotational matrix and a transpose of a predicted rotational matrix, then subtracting an identity matrix to obtain an outcome, and taking the absolute value of the outcome. That is, $L_r=\|R_{gt}R^T-I\|$, where $L_r$ is the rotational loss value, $R_{gt}$ is the rotation of the ground truth of the tracked object, $R^T$ is the transpose of the rotation of the predicted 3D keypoints (i.e., predicted rotational matrix), and I is an identity matrix. This calculation quantifies how different the predicted 3D keypoints are from the transformed 3D model keypoints in terms of rotation. The predicted rotational matrix R is derived from the predicted 3D keypoints (WZ), the ground truth translation ($T_{gt}$) and model keypoints (M). Accordingly, the predicted rotational matrix R is not explicitly predicted, instead, the 3D keypoints are predicted and, with other values, utilized to determine the predicted rotational matrix.

Integrating both translational and rotational loss values ensures that the keypoint detector predictions are attuned to the 3D model's translation and rotation. Accordingly, in some examples, the keypoint detector is trained to understand the position of keypoints based on the translational loss values and rotational loss values. Consequently, the keypoint detector utilizes these values to more accurately predict the location of any keypoint that may be occluded or obscured in the 2D image. That is, the keypoint detector is trained to understand how a specific keypoint should be positioned in an ideal 3D pose from 2D keypoints. This training process allows the keypoint detector to adjust future predictions, ensuring optimal translation and rotation for each keypoint.

The optimization module 128 is configured to train the keypoint detector to minimize the loss value during a training period, using an optimizer. That is, the optimization module 128 refines the keypoint detector's predictions to minimize the loss value. In some examples, the loss value may include the translational loss value and the rotational loss value. In other examples, the loss value may include other combinations of loss values. By incorporating both predicted 2D keypoints and predicted 3D keypoints, the optimization module 128 ensures that the keypoint detector not only achieves high accuracy in 2D keypoint detection but also adapts to the object's 3D geometry, to more accurately handle diverse input data scenarios. Any of various optimizers can be employed by the optimization module 128 to minimize the loss value. In some examples, the optimizer utilizes a machine learning algorithm to optimize the keypoint detector during the training period.

Figure 3:
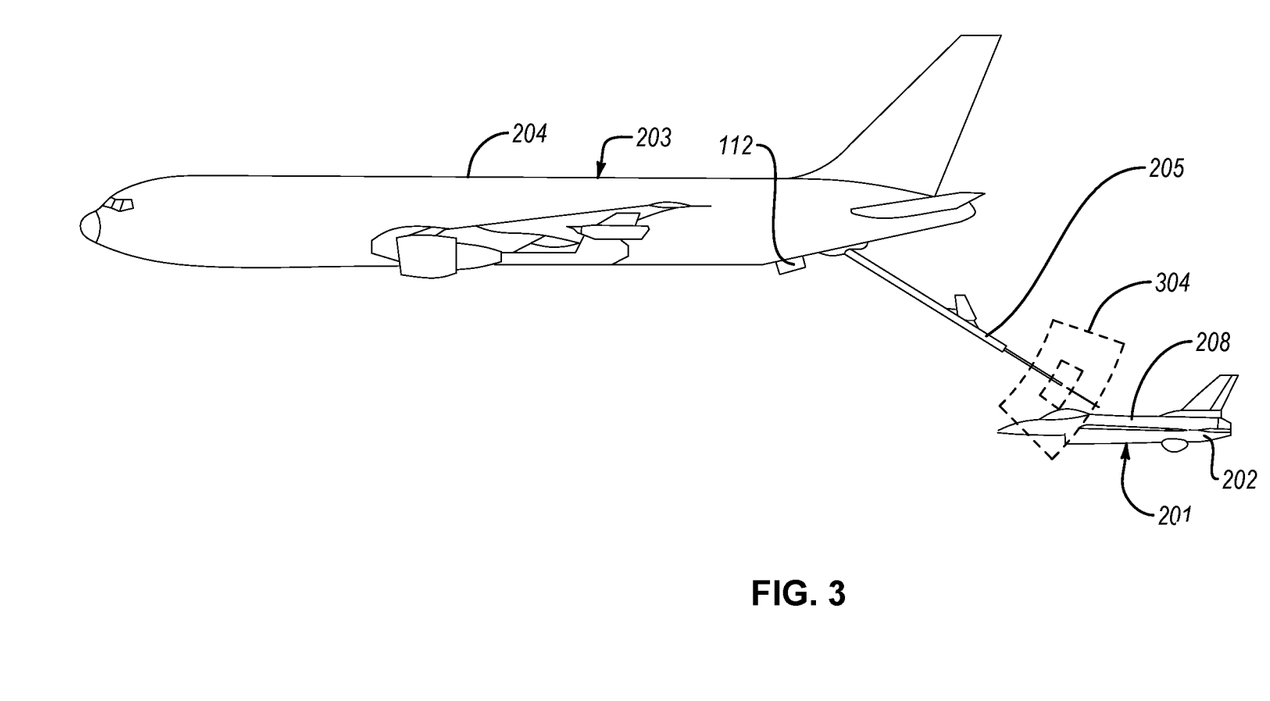
FIG. 3 is a schematic, side view of a vision-based tracking system using a neural network trained using a neural network training system, according to one or more examples of the present disclosure.

After training the keypoint detector, using the neural network training apparatus 110, the keypoint detector may be used within a vision-based tracking system. After training with the neural network training apparatus 110, the keypoint detector is better equipped to handle 2D keypoint prediction with increased accuracy and adaptability in diverse input data scenarios within the vision-based tracking system. Specifically, during the tracking process, the keypoint detector will receive an actual 2D image of an object involved in the vision-based tracking system, and predict a set of 2D keypoints on the object in the 2D image. In some examples, the keypoint detector computes a predicted 3D pose based on the predicted 2D keypoints. A process, such as a coupling process, between the object and a second object will be controlled based on the predicted 3D pose. For example, as shown in FIG. 3, the predicted 3D pose may be used to guide a refueling operating between a receiver aircraft and a tanker aircraft.

Figure 2:
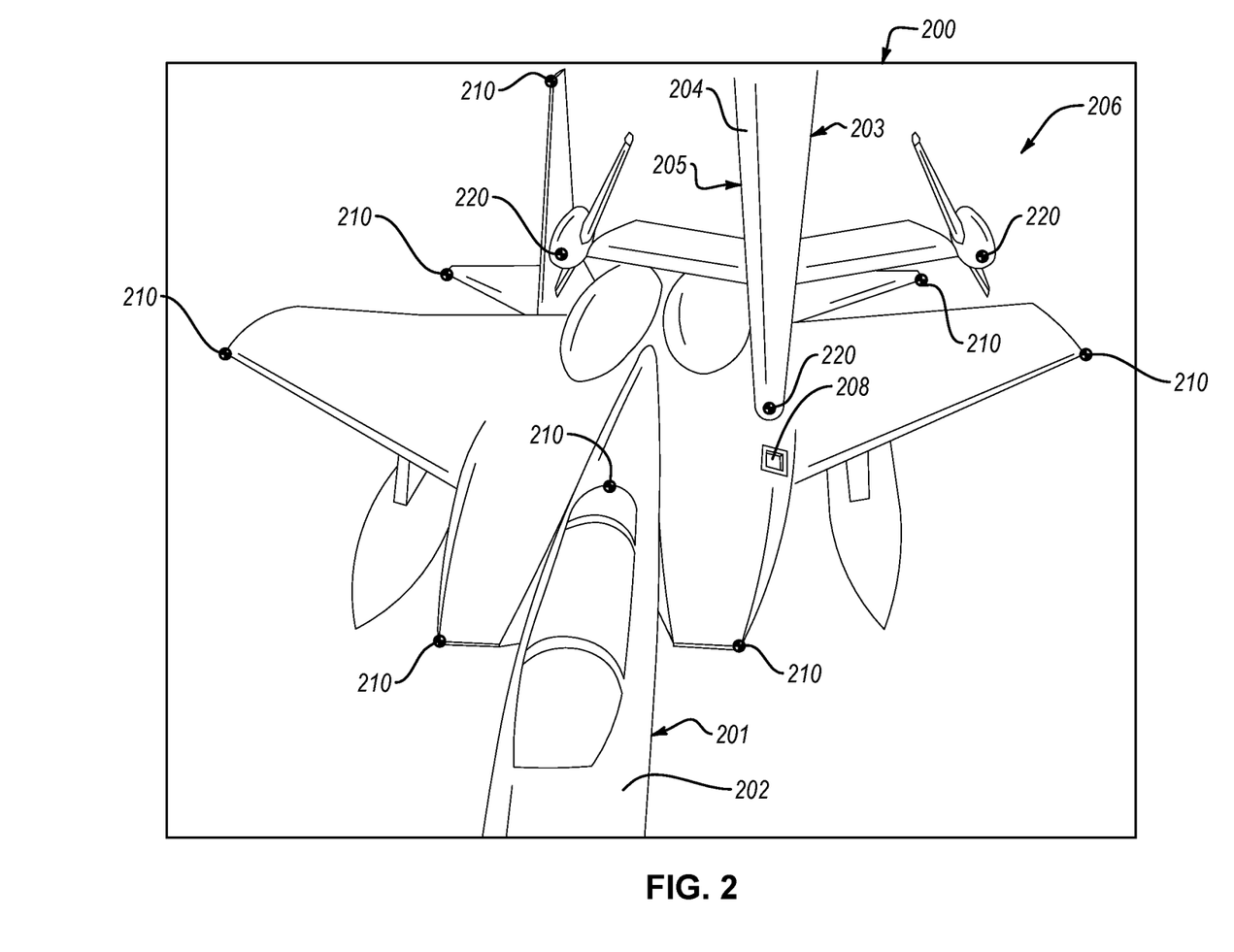
FIG. 2 is a schematic, perspective view of a two-dimensional image used within a neural network training system, according to one or more examples of the present disclosure.

As shown in FIG. 2, a two-dimensional (2D) image 200 of a three-dimensional (3D) space is produced by the camera system 108, and the resulting image is received by the image capture module 118. In some examples, the 2D image 200 is an actual 2D image taken by the camera system 108. The camera system 108 may produce the 2D image 200 from a single image captured by the camera 112 or extract the 2D image 200 from a video feed of the camera 112. In other examples, the 2D image 200 is a synthetic or simulated 2D image that is artificially generated or augments, to represent a 2D image that would be obtained from the camera system 108. At least one camera intrinsic is known for the camera system 108, where the 2D image is an actual 2D image or a simulated 2D image. The 2D image 200 may be provided as an RGB image, that is, an image represented in color using the red, green, and blue color channels. The 2D image 200 is configured to include at least a portion of a tracked object 201. That is, the entirety of the tracked object 201 is not required to be captures in the 2D image 200. In some examples, the 2D image 200 also includes at least a portion of the host object 203. As shown, the 3D space, represented in the 2D image 200, includes both a portion of the host object 203 and a portion of the tracked object 201. For example, as shown, the tracked object 201 is a receiver aircraft 202 which includes a boom nozzle receiver 208 (i.e., coupling location). The host object 203 is a tanker aircraft 204 having a deployed refueling boom 205 that is capable of coupling to the tracked object 201 at the boom nozzle receiver 208. Accordingly, during a vision-based tracking process, in order to accomplish fuel transfer from the tanker aircraft 204, the refueling boom 205 is coupled to the receiver aircraft 202 (see, i.e., FIG. 3).

Using the keypoint detector, a set of keypoints are predicted within the 2D image 200, to generate predicted 2D keypoints. That is, the keypoint detector is configured to predict a set of keypoints on the tracked object to generate predicted 2D keypoints 210. In some examples, a second keypoint detector may be trained using the neural network training apparatus 110 to predict a set of keypoints on the host object 203, using a 3D model of the host object, to generate predicted host 2D keypoints 220, allowing for spatial relationship between the tracked object 201 and the host object 203 to be depicted by the predicted 2D keypoints 210 and the predicted host 2D keypoints 220, respectively.

The 2D image 200, when captured during in real-time conditions, includes a background 206 and various environmental variables. Moreover, the 2D image 200, when produced by simulated data, may also include a simulated background and/or various environmental variables. The background 206 and environmental variables may include but are not limited to occlusions, self-occlusions, lighting variations, lens flares, or external disruptions (e.g., weather). The background 206 and/or environmental variables can pose challenges to predicting the predicted 2D keypoints 210, as the visual elements in the tracked object 201 may be washed out, distorted, obscured, etc. Consequently, the predicted 2D keypoints 210 predicted by the keypoint detector may not be accurate due to the semantic factors, such as weather conditions or the presence of interfering objects, which may not be accounted for in the predicted keypoint locations.

Shown in FIG. 3 is one example of a vision-based tracking system that is configured to control a refueling operation (e.g., coupling process) between the receiver aircraft 202 and a deployed refueling boom 205 of the tanker aircraft 204 shown in FIG. 2. The vision-based tracking system is used to perform a process, such as a coupling process, after training the vision-based tracking system to predict keypoints using the neural network training apparatus 110. Accordingly, the 2D image 200 is generated by the camera 112, or simulated based on the camera 112, to be used during the training process of the keypoint detector. The camera 112 is fixed to the tanker aircraft 204 as the field of view 304 of the camera 112 contains a view of a portion of the receiver aircraft 202, including the boom nozzle receiver 208, or coupling location, and a view of a portion of the deployed refueling boom 205 of the tanker aircraft 204. The camera 112 is fixed, relative to the receiver aircraft 202 (i.e., tracking object) such that the camera 112 intrinsics can be used to determine the depth information for the predicted 2D keypoints that are projected into 3D space.

Although shown with aircraft, it should be appreciated that predicting keypoints using a keypoint detector may be used with any tracked object 201 and host object 203. Specifically, a coupling process or close quarter operation, such as shown with the aircraft 202 and 204, may occur between any tracked object 201 and host object 203, such as other vehicles. The vehicles may be any vehicles that move in a space (in water, on land, in air, or in space). In other examples, vision-based tracking systems can be used in any system that employs visual information, typically captured through cameras or other imaging devices, to monitor and track objects or subjects within a given environment. For example, vision-based tracking systems may be used within aviation, autonomous vehicles, medical imaging, industrial automation, etc., and used in applications such as aerial refueling processes, object tracking, robot navigation, and more, where understanding the precise location and orientation of objects in a scene is crucial for real-world interactions and decision-making.

Figure 4A:
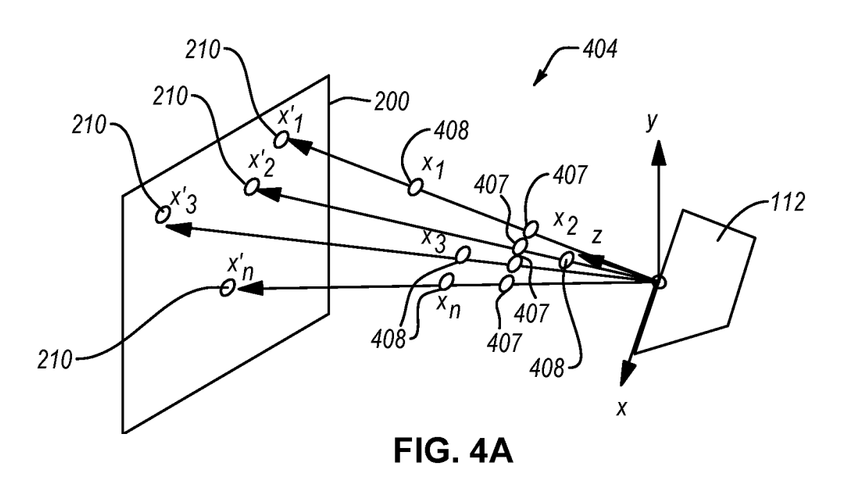
FIG. 4A is a schematic, perspective view of two-dimensional (2D) keypoints on an object projected to three-dimensional (3D) space, according to one or more examples of the present disclosure.

As shown in FIG. 4A, by way of example only, predicted 2D keypoints 210 are represented by predicted 2D keypoints $X'_1, X'_2, X'_3, X'_n$ within the 2D image 200. Although shown with four predicted keypoints, any number of keypoints can be predicted, up to N number of keypoint, as desired. The predicted 2D keypoints 210 are projected into a 3D camera space 404 from the camera 112 as initial 3D keypoints 407. The initial 3D keypoints 407 are the projection of the predicted 2D keypoints 210 into 3D camera space 404 that have direction information but not depth information. Using the loss value equation, $L=\|WZ-(RM+T)\|$, the term W represents the initial 3D keypoints 407. In other words, the initial 3D keypoints 407 are depthless 3D vectors. Accordingly, the initial 3D keypoints 407 are modified with depth information to generate predicted 3D keypoints 408. The term WZ represents the predicted 3D keypoints 408, which are the initial 3D keypoint modified by the term Z, or depth information. The predicted 3D keypoints 408 are represented by predicted 3D keypoints $X_1$, $X_2$, $X_3$, $X_n$, where predicted 2D keypoint $X'_1$ is projected and modified to generate predicted 3D keypoint $X_1$, predicted 2D keypoint $X'_2$, is projected and modified to generate predicted 3D keypoint $X_2$, predicted 2D keypoint $X'_3$ is projected and modified to generate predicted 3D keypoint $X_3$, and predicted 2D keypoint $X'_n$ is projected and modified to generate predicted 3D keypoint $X_n$.

Figure 4B:
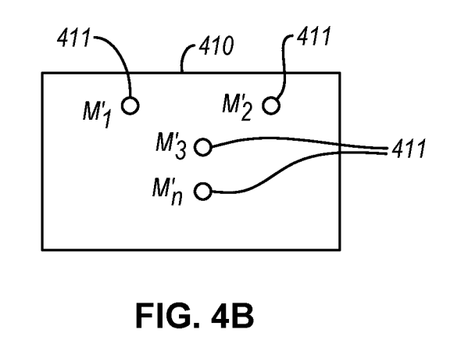
FIG. 4B is a schematic, perspective view of a 3D model of the object of FIG. 4B with 3D model keypoints, according to one or more examples of the present disclosure.

Referring to FIG. 4B, a 3D model 410, represented by a box shape is shown. The 3D model 410 is a 3D model of the tracked object in the 2D image 200. The geometry of the 3D model 410 is known to the neural network training apparatus 110 (i.e. training pipeline) such that the training pipeline understands the volumetric representation of the tracked object in the 2D image 200. In other words, the tracked object's 3D model is incorporated into the learning process of the keypoint detector, so that in addition to learning keypoints based on their 2D locations, the keypoint detector also learns keypoint location based on the 3D structure of the model. The 3D model 410 may be generated using any 3D modeling method, such as a CAD model. Known 3D model keypoints 411 are established on the 3D model 410 and lack translation and rotation information. The known 3D model keypoints 411 are represented by known 3D model keypoints $M'_1$, $M'_2$, $M'_3$, $M'_n$. The term M represents the known 3D model keypoints 411 in the model space.

Figure 4C:
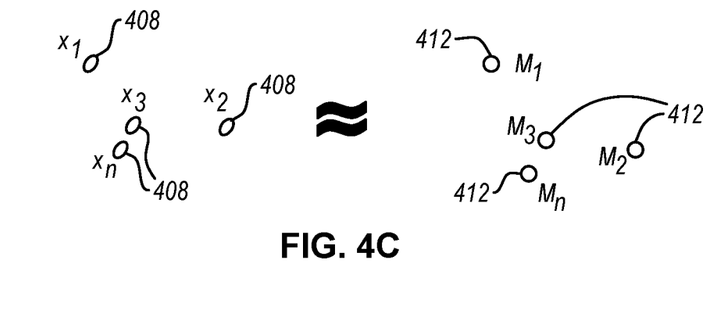
FIG. 4C is a schematic, perspective view of the 2D keypoints projected to 3D space of FIG. 4A compared to the 3D model keypoints of FIG. 4B, according to one or more examples of the present disclosure.

Referring to FIG. 4C, the known 3D model keypoints 411 are transformed to transformed 3D model keypoints 412 by adding known rotational and translational information of the tracked object in the 2D image 200. The transformed 3D model keypoints 412 are represented by transformed 3D model keypoints $M_1$, $M_2$, $M_3$, $M_n$, where known 3D model keypoint $M'_1$ is transformed to generate transformed 3D model keypoint $M_1$, known 3D model keypoint $M'_2$, is transformed to generate transformed 3D model keypoint $M_2$, known 3D model keypoint $M'_3$ is transformed to generate transformed 3D model keypoint $M_3$, and known 3D model keypoint $M'_n$ is transformed to generate transformed 3D model keypoint $M_n$. That is, the transformed 3D model keypoints are obtained by transforming the initial known 3D model keypoints into a representation that aligns with the variations introduced by rotation and translation of the tracked object when the 2D image was captured. The terms R and T represent the known rotational and translational information, respectively.

During the training of the keypoint detector, the goal is to minimize the loss value, term L. In other words, the keypoints detector aims to bring the terms WZ as closely aligned as possible with the terms RM+T. Accordingly, the keypoint detector attempts to achieve the predicted 3D keypoints 408 being approximately equal to the transformed 3D model keypoints 412. Such that, for example, predicted 3D keypoint $X_1$ is approximately equal to transformed 3D model keypoint $M_1$, predicted 3D keypoint $X_2$ is approximately equal to transformed 3D model keypoint $M_2$, predicted 3D keypoint $X_3$ is approximately equal to transformed 3D model keypoint $M_3$, and predicted 3D keypoint $X_n$ is approximately equal to transformed 3D model keypoint $M_n$.

Figure 5:
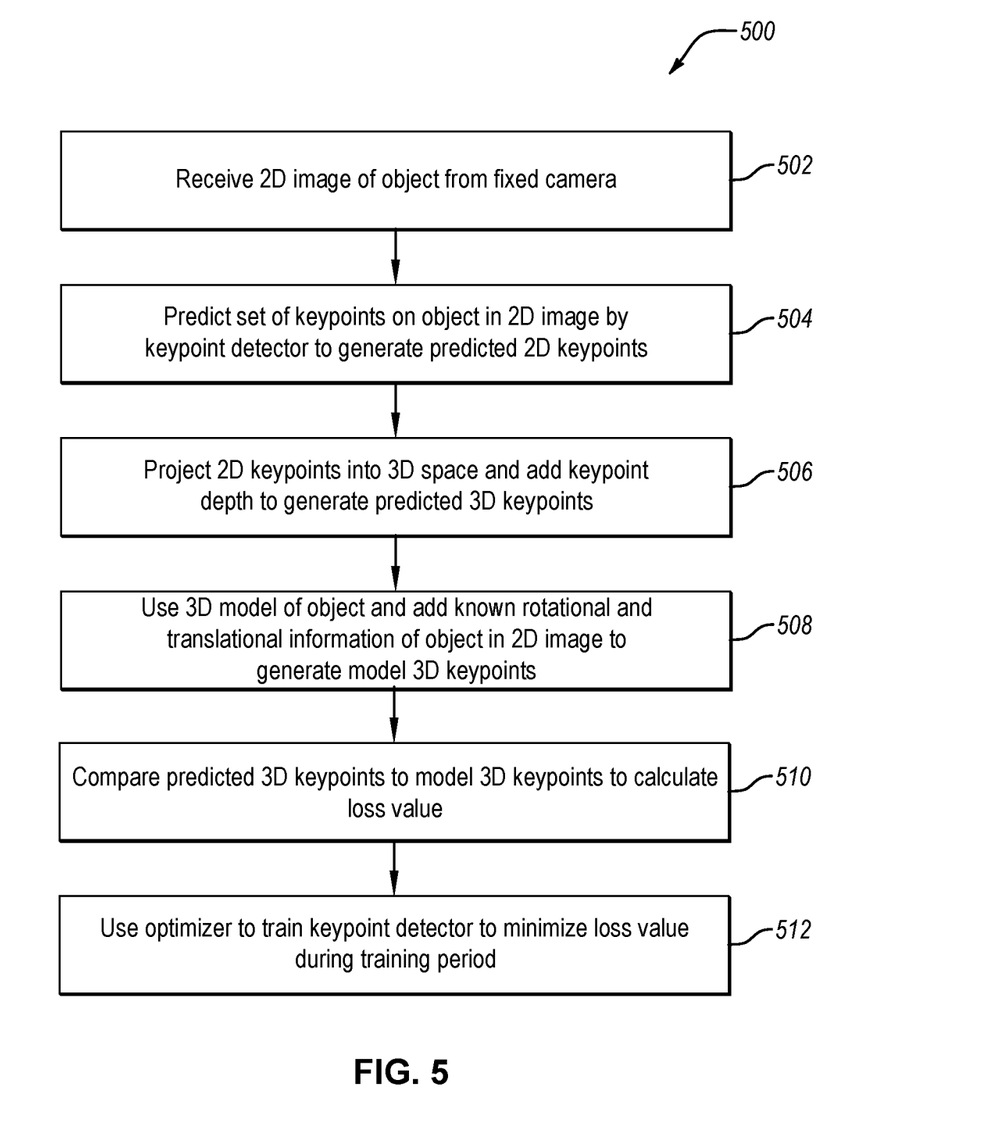
FIG. 5 is a schematic flow diagram of a method of training a neural network used in a vision-based tracking system, according to one or more examples of the present disclosure.

Referring to FIG. 5, a method 500 of training a neural network (i.e., keypoint detector) used in a vision-based tracking system is shown. The method 500 includes (block 502) receiving a two-dimensional (2D) image of at least a portion of an object via a camera that is fixed, relative to the object. The camera includes camera intrinsics that are known by the keypoint detector. The method 500 also includes (block 504) predicting a set of keypoints on the object in the 2D image by the keypoint detector to generate predicted 2D keypoints. The method 500 further includes (block 506) projecting the predicted 2D keypoints into three-dimensional (3D) space and adding keypoint depth information to generate predicted 3D keypoints. Initially, projected 2D keypoints lack depth information, and are therefore projected as 3D vectors into camera space. Therefore, depth information, determined using the known camera intrinsics, is added to the projected 2D keypoints.

The method 500 also includes (block 508) using a 3D model of the object and adding known rotational and translational information of the object in the 2D image to generate transformed 3D model keypoints. The known rotational and translational information may be known and pre-defined in simulation data, or may be measured in real data by a physical sensor. The method 500 further includes (block 510) comparing the predicted 3D keypoints to the transformed 3D model keypoints to calculate a loss value. The method 500 additionally includes (block 512) using an optimizer to train the keypoint detector to minimize the loss value during a training period.

As referenced herein, the computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A computer implemented method of training a neural network used in a vision-based tracking system, the method comprising:
   receiving a two-dimensional (2D) image of at least a portion of an object via a camera that is fixed, relative to the object;
   predicting a set of keypoints on the object in the 2D image by a keypoint detector to generate predicted 2D keypoints;
   projecting the predicted 2D keypoints into three-dimensional (3D) space and adding keypoint depth information to generate predicted 3D keypoints;
   using a 3D model of the object and adding known rotational and translational information of the object in the 2D image to generate transformed 3D model keypoints;
   comparing the predicted 3D keypoints to the transformed 3D model keypoints to calculate a loss value; and
   using an optimizer to train the keypoint detector to minimize the loss value during a training period.

2. The computer implemented method of claim 1, wherein the camera is configured to be fixed on a host object.

3. The computer implemented method of claim 1, wherein:
   the camera comprises camera intrinsics; and
   the step of projecting the predicted 2D keypoints into 3D space relies on knowing at least one of the camera intrinsics to project the predicted 2D keypoints into 3D space.

4. The computer implemented method of claim 3, wherein the keypoint depth information is at least partially determined based on the camera intrinsics known by the keypoint detector.

5. The computer implemented method of claim 1, wherein the 3D model of the object is in a fixed position without any rotation or translation.

6. The computer implemented method of claim 1, wherein the known rotational and translational information of the object is obtained from real data measured by at least one physical sensor coupled to the object.

7. The computer implemented method of claim 1, wherein the known rotational and translational information of the object is obtained from simulated data; and
   the known rotational and translational information is pre-defined in the simulated data.

8. The computer implemented method of claim 1, wherein the object is a receiver aircraft.

9. The computer implemented method of claim 1, wherein, after training the keypoint detector, the keypoint detector is configured to be used to compute a predicted 3D pose based on the predicted 2D keypoints.

10. The computer implemented method of claim 9, wherein the predicted 3D pose is used to guide a refueling operating between a receiver aircraft and a tanker aircraft.

11. The computer implemented method of claim 1, wherein the loss value comprises a translational loss value and a rotational loss value.

12. The computer implemented method of claim 11, wherein:

the translational loss value is calculated by computing an absolute difference between a predicted translation vector of the object and a ground truth translation vector of the object; and the rotational loss value is calculated by computing a matrix product of a ground truth rotational matrix and a transpose of a predicted rotational matrix, then subtracting an identity matrix to obtain an outcome, and taking an absolute value of the outcome.

13. The computer implemented method of claim 1, wherein:

the loss value comprises a composite of at least one of first loss values and at least one of second loss values, wherein:

the first loss values comprise:
a translational loss value;
a rotational loss value; and
a 3D keypoint loss value; and the second loss values comprise:
the translational loss value;
the rotational loss value;
the 3D keypoint loss value; and
a 2D keypoint loss value.

14. A vision-based tracking training apparatus comprising:

at least one processor; and a memory device storing instructions, which, when executed by the at least one processor, cause the at least one processor to, at least:

receive a two-dimensional (2D) image of at least a portion of an object via a camera that is fixed, relative to the object;

predict a set of keypoints on the object in the 2D image by a keypoint detector to generate predicted 2D keypoints;

project the predicted 2D keypoints into three-dimensional (3D) space and add keypoint depth information to generate predicted 3D keypoints;

utilize a 3D model of the object and add known rotational and translational information of the object in the 2D image to generate transformed 3D model keypoints;

compare the predicted 3D keypoints to the transformed 3D model keypoints to calculate a loss value; and utilize an optimizer to train the keypoint detector to minimize the loss value during a training period.

15. The apparatus of claim 14, wherein:
the camera comprises camera intrinsics; and
projecting the predicted 2D keypoints into 3D space relies on knowing at least one of the camera intrinsics.

16. The apparatus of claim 14, wherein the loss value comprises a translational loss value and a rotational loss value.

17. The apparatus of claim 16, wherein:

the translational loss value is calculated by computing an absolute difference between a predicted translation vector of the object and a ground truth translation vector of the object; and the rotational loss value is calculated by computing a matrix product of a ground truth rotational matrix and a transpose of a predicted rotational matrix, then subtracting an identity matrix to obtain an outcome, and taking an absolute value of the outcome.

18. A vision-based tracking training system comprising:

a camera fixed relative to an object;

at least one processor; and a memory device storing instructions, which, when executed by the at least one processor, cause the at least one processor to, at least:

receive a two-dimensional (2D) image of at least a portion of the object via the camera;

predict a set of keypoints on the object in the 2D image by a keypoint detector to generate predicted 2D keypoints;

project the predicted 2D keypoints into three-dimensional (3D) space and add keypoint depth information to generate predicted 3D keypoints;

utilize a 3D model of the object and add known rotational and translational information of the object in the 2D image to generate transformed 3D model keypoints;

compare the predicted 3D keypoints to the transformed 3D model keypoints to calculate a loss value; and utilize an optimizer to train the keypoint detector to minimize the loss value during a training period.

19. The system of claim 18, wherein:
the camera comprises camera intrinsics; and
projecting the predicted 2D keypoints into 3D space relies on knowing at least one of the camera intrinsics.

20. The system of claim 18, wherein the loss value comprises a translational loss value and a rotational loss value.

* * * * *